(12) United States Patent
Hickey et al.

(10) Patent No.: US 8,412,760 B2
(45) Date of Patent: Apr. 2, 2013

(54) DYNAMIC RANGE ADJUSTING FLOATING POINT EXECUTION UNIT

(75) Inventors: Mark J Hickey, Rochester, MN (US);
Adam J Muff, Rochester, MN (US);
Matthew R Tubbs, Rochester, MN (US); Charles D Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 12/177,444

(22) Filed: Jul. 22, 2008

(65) Prior Publication Data

US 2010/0023568 A1 Jan. 28, 2010

(51) Int. Cl.
*G06F 7/38* (2006.01)
(52) U.S. Cl. ............................ 708/513; 708/496; 708/542
(58) Field of Classification Search .......... 708/495–499, 708/513, 518; 712/210, 222
See application file for complete search history.

(56) References Cited

U.S. PATENT DOCUMENTS

| | | | | |
|---|---|---|---|---|
| 4,675,809 A * | 6/1987 | Omoda et al. | ................. | 712/222 |
| 5,268,855 A * | 12/1993 | Mason et al. | ................. | 708/513 |
| 5,384,723 A * | 1/1995 | Karim et al. | ................. | 708/205 |
| 5,515,520 A * | 5/1996 | Hatta et al. | ................. | 708/550 |
| 6,253,299 B1* | 6/2001 | Smith et al. | ................. | 711/171 |
| 6,405,305 B1* | 6/2002 | Meier et al. | ................. | 712/222 |
| 2005/0188179 A1* | 8/2005 | Henry et al. | ................. | 712/210 |
| 2007/0203967 A1* | 8/2007 | Dockser | ................. | 708/495 |
| 2011/0004644 A1* | 1/2011 | Henry et al. | ................. | 708/231 |

FOREIGN PATENT DOCUMENTS

JP  11161468 A  6/1999

* cited by examiner

*Primary Examiner* — Chuong D Ngo
*Assistant Examiner* — Matthew Sandifer
(74) *Attorney, Agent, or Firm* — Wood, Herron & Evans LLP

(57) ABSTRACT

A floating point execution unit is capable of selectively repurposing a subset of the significand bits in a floating point value for use as additional exponent bits to dynamically provide an extended range for floating point calculations. A significand field of a floating point operand may be considered to include first and second portions, with the first portion capable of being concatenated with the second portion to represent the significand for a floating point value, or, to provide an extended range, being concatenated with the exponent field of the floating point operand to represent the exponent for a floating point value.

18 Claims, 7 Drawing Sheets

DYNAMIC RANGE ADJUSTING FLOATING POINT EXECUTION UNIT

FIELD OF THE INVENTION

The invention is generally related to data processing, and in particular to processor architectures and floating point execution units incorporated therein.

BACKGROUND OF THE INVENTION

Floating point execution units are often used in computer processors to accelerate the processing of complex mathematic computations. Floating point calculations involve performing mathematical computations using one or more floating point values. A floating point value is typically represented as a combination of an exponent and a significand. The significand, which may also be referred to as a fraction or mantissa, represents the digits in a floating point value with a predetermined precision, while the exponent represents the relative position of the binary point for the floating point value.

Conventional floating point execution units are limited to performing arithmetic operations that fit within the exponent range defined by the floating point standard that they are designed to support. The two dominant and widely used floating point standards are IEEE-754 single precision and double precision. The single precision standard uses 32 bits, while double precision uses 64 bits. The single precision standard defines 1 bit to represent the sign, 8 bits to represent the biased exponent and the remaining 23 bits represent the significand. This definition allows a single precision number to range between approximately $-2^{128}$ and $2^{128}$. The double precision standard allows for a much wider range of floating point values, as it uses 11 bits for the biased exponent (approximately $-2^{1024}$ and $2^{1024}$). Furthermore, the double precision standard includes 52 bits for the significand, thus providing substantially greater precision.

Floating point execution units may be implemented as scalar execution units or vector execution units. Scalar execution units typically operate on scalar floating point values, while vector execution units operate on vectors comprising multiple scalar floating point values. Vector floating point execution units have become popular in many 3D graphics hardware designs because much of the data processed in 3D graphics processing is readily vectorizable (e.g., coordinates of objects in space are often represented using 3 or 4 floating point values). In many conventional designs, vector floating point execution units will use four single precision floating point execution units to process the words in the floating point vectors, because most of the arithmetic in 3D graphics usually fits in the single precision range. In some situations, however, single precision floating point values are not sufficient for some calculations, and double precision arithmetic may be required.

While double precision floating point execution units have greater flexibility for handling a wider range of arithmetic operations, the additional circuitry required to handle double precision floating point values can be costly in terms of power consumption, performance and chip real estate. In general, a four word double precision floating point vector execution unit occupies approximately 2.5-3 times the circuit area of a comparable single precision unit. In addition, double precision units have lower performance, and higher power consumption, than their single precision counterparts. In cases where the arithmetic has too large a range to fit within the bounds of the single precision definition, often times the calculations must be performed with a double precision scalar (not vector) unit, which lowers performance dramatically. In addition, in many conventional graphics processing units (GPUs), oftentimes no double precision unit exists on the chip, so the calculations must be done on the CPU, which lowers performance even further.

It has been found, however, that in many situations, in particular in many computer graphics situations, where double precision floating point numbers are required, they are often only required for their larger exponent range rather than the numerical precision they provide. For example, in the computer gaming realm, cases may exist where a game developer may desire to place and scale objects in a 3D graphics scene that vary greatly in size. For instance, imagine a scene where the viewer is placed in a space ship, traveling towards a planet-sized object at high speed. As the camera moves closer and closer to the object, more detail can be observed. Eventually, the camera is directly on the surface of the object and can begin to magnify and focus on microscopic details such as circuitry or bacteria. The developer's desire is to have this scene be continuous and not change units of measurement, for reasons of art direction and performance. In many instances like this, single precision floating point values do not provide the necessary range.

A need therefore exists in the art for a manner of providing the capability for a floating point execution unit to handle a greater range of floating point values without the additional circuitry that would otherwise be required were a more precise floating point execution unit used.

SUMMARY OF THE INVENTION

The invention addresses these and other problems associated with the prior art by providing a floating point execution unit that is capable of selectively repurposing a subset of the significand bits in a floating point value as additional exponent bits to dynamically provide an extended range for floating point calculations. In particular, a significand field of a floating point operand may be considered to include first and second portions, with the first portion capable of being concatenated with the second portion to represent the significand for a floating point value, or, to provide an extended range, being concatenated with the exponent field of the floating point operand to represent the exponent for a floating point value.

Consistent with one aspect of the invention, a circuit arrangement includes an operand input configured to receive floating point operands, where each floating point operand received by the operand input is configured with an exponent field and a significand field, with the significand field including a first portion and a second portion. The circuit arrangement also includes a floating point execution unit coupled to the operand input and configured to process floating point operands received by the operand input during execution of floating point instructions. The floating point execution unit is configured to execute a first floating point instruction for which a first floating point operand has been received by the operand input by using data stored in the exponent field of the first floating point operand as an exponent and by concatenating data stored in the first and second portions of the significand field of the first floating point operand for use as a significand. The floating point execution unit is also configured to execute a second floating point instruction for which a second floating point operand has been received by the operand input by concatenating data stored in the exponent field and the first portion of the significand field of the second floating point operand for use as an exponent and by using data stored in the second portion of the significand field of the second floating point operand as a significand.

Consistent with another aspect of the invention, a method of executing floating point instructions in a floating point execution unit includes receiving first and second floating point instructions, where the first floating point instruction identifies a first floating point operand and the second floating point instruction identifies a second floating point operand, and where each of the first and second floating point operands is configured with an exponent field and a significand field, with the significand field including a first portion and a second portion. The exponent field, first portion of the significand field and second portion of the significand field in the first floating point operand are respectively mapped to the same bits as the exponent field, first portion of the significand field and second portion of the significand field in the second floating point operand. The method includes executing the first floating point instruction in the floating point execution unit by using data stored in the exponent field of the first floating point operand as an exponent and by concatenating data stored in the first and second portions of the significand field of the first floating point operand for use as a significand, and executing the second floating point instruction in the floating point execution unit by concatenating data stored in the exponent field and the first portion of the significand field of the second floating point operand for use as an exponent and by using data stored in the second portion of the significand field of the second floating point operand as a significand.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a dynamic range adjusting floating point execution unit that selectively treats a subset of the fraction or significand bits of a floating point number as additional exponent bits, and assumes a different exponent bias to provide an increased floating point range. In addition, special arithmetic instructions, or alternatively a special mode, may be defined in some embodiments to shift the correct significand bits into the significand path of the floating point execution unit, and to make use of the appropriate exponent bias. Moreover, in some embodiments, automatic switching to an extended range mode may be performed, e.g., in response to an excessive number of overflow conditions.

Hardware and Software Environment

Figure 1:
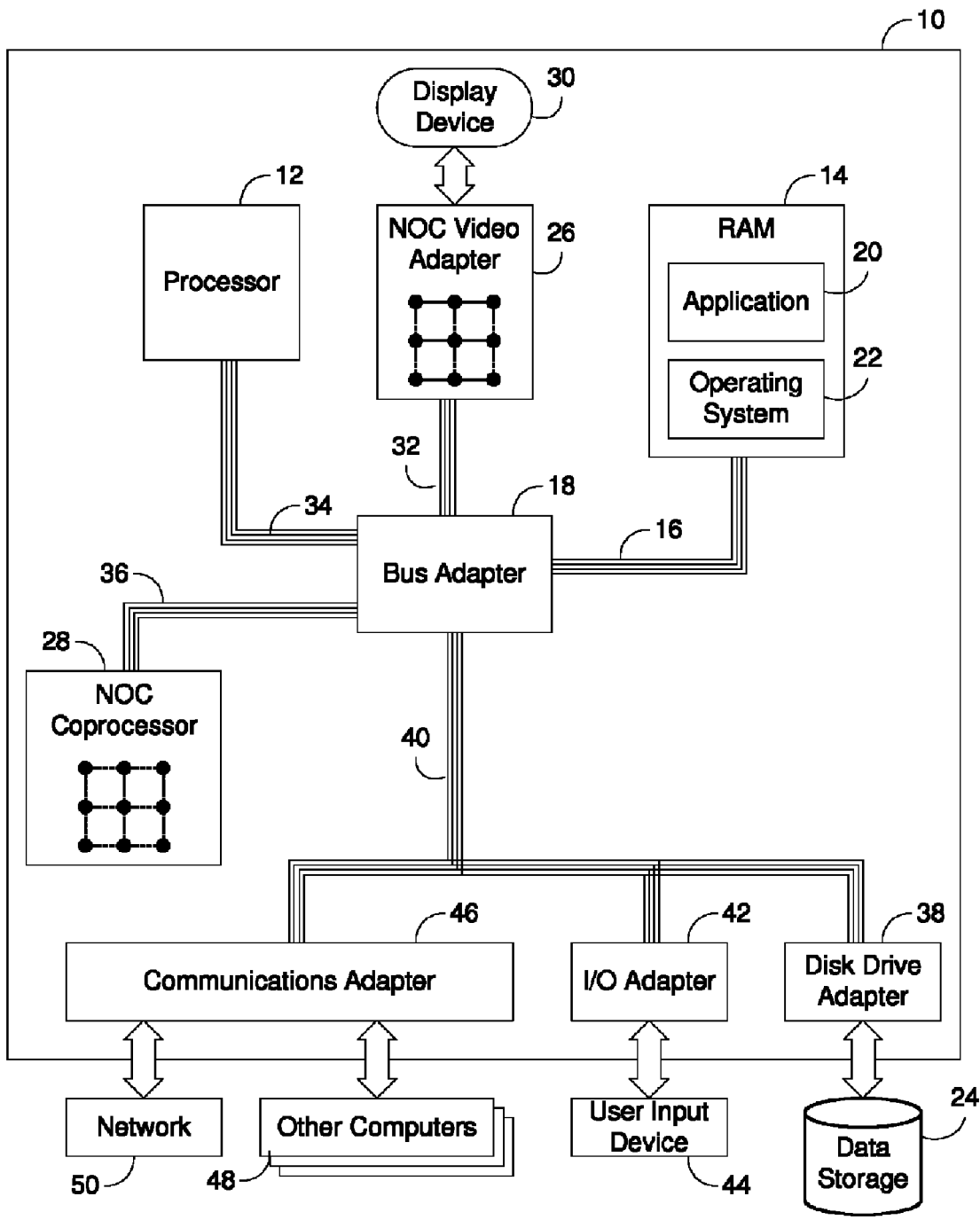
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
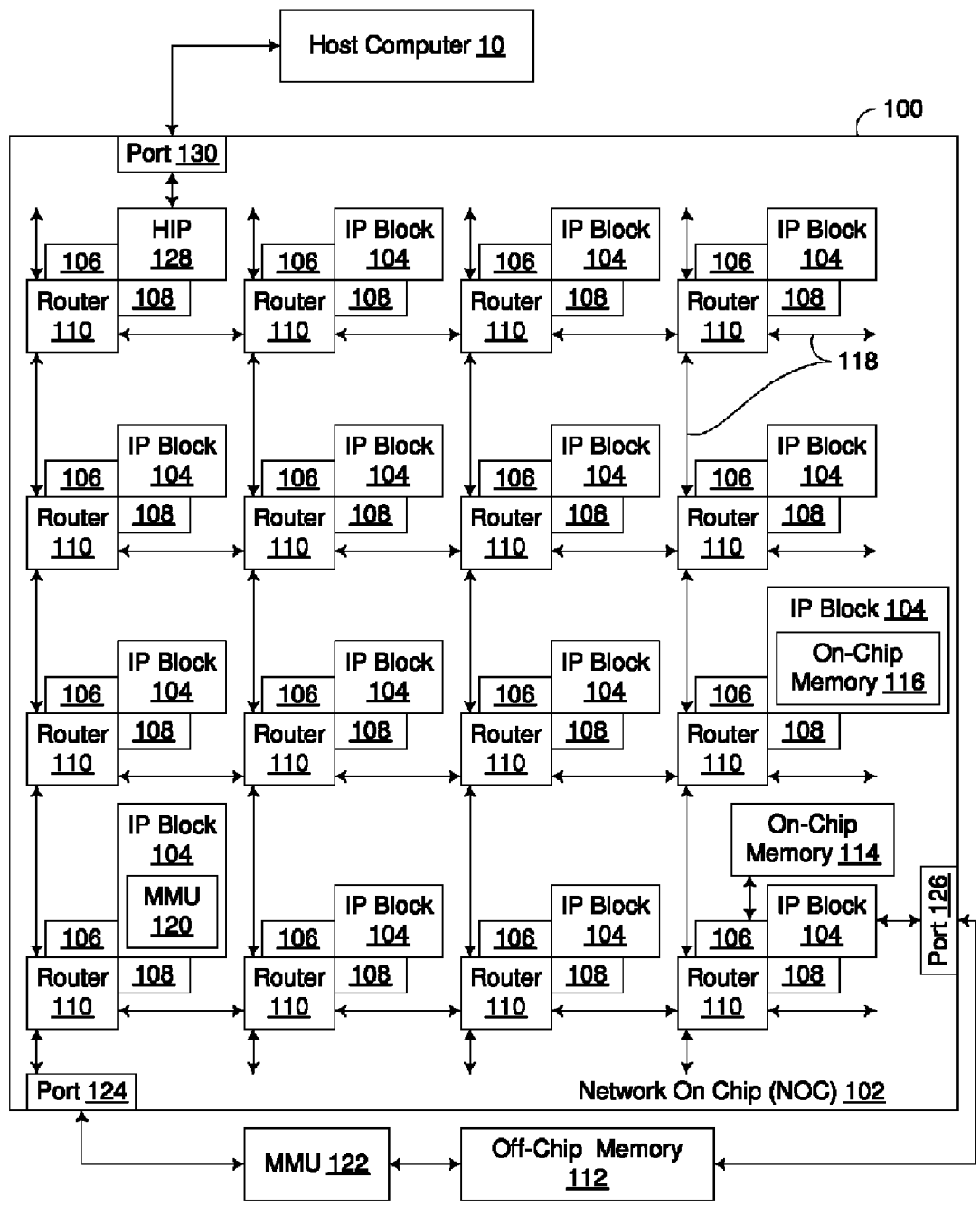
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
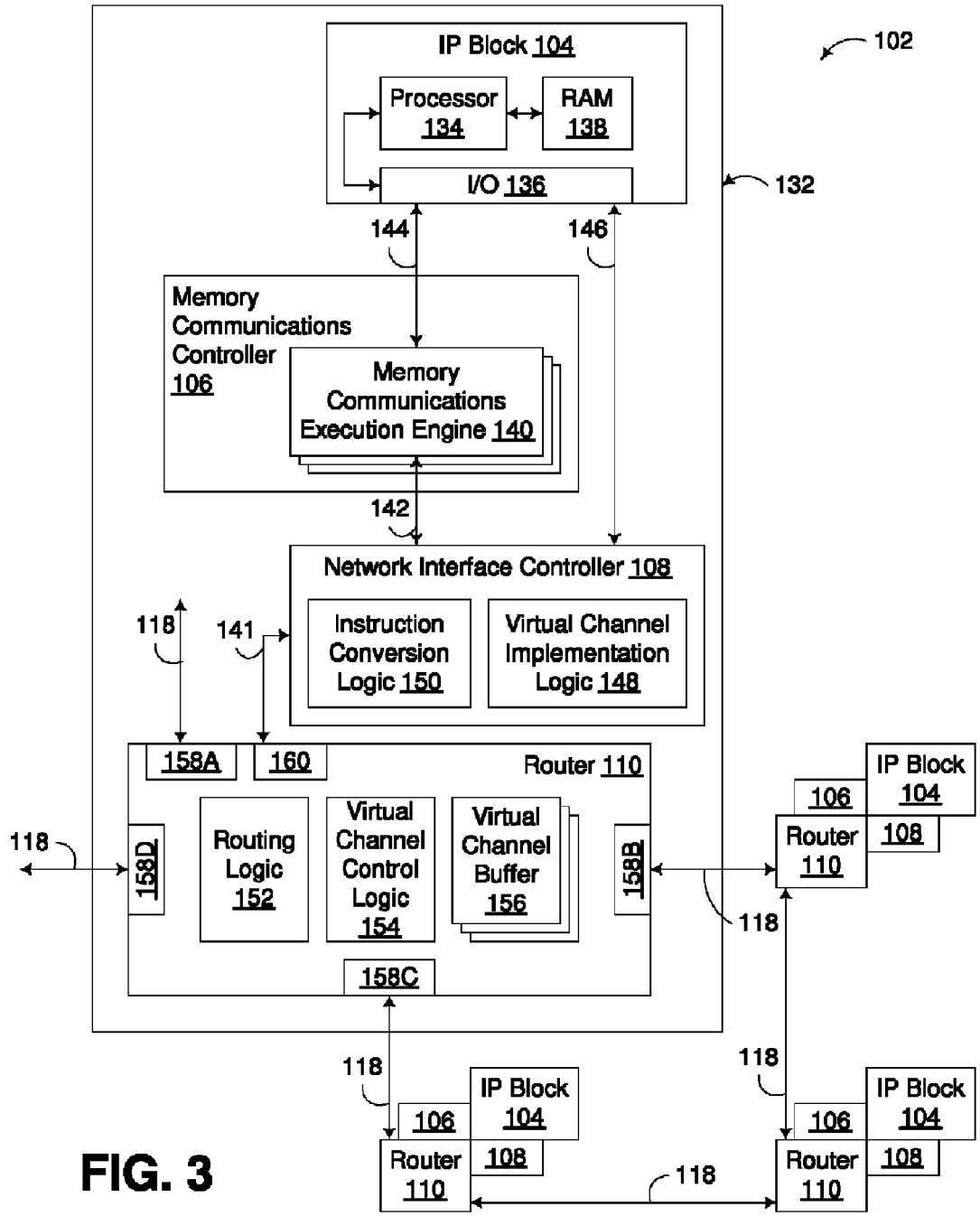
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
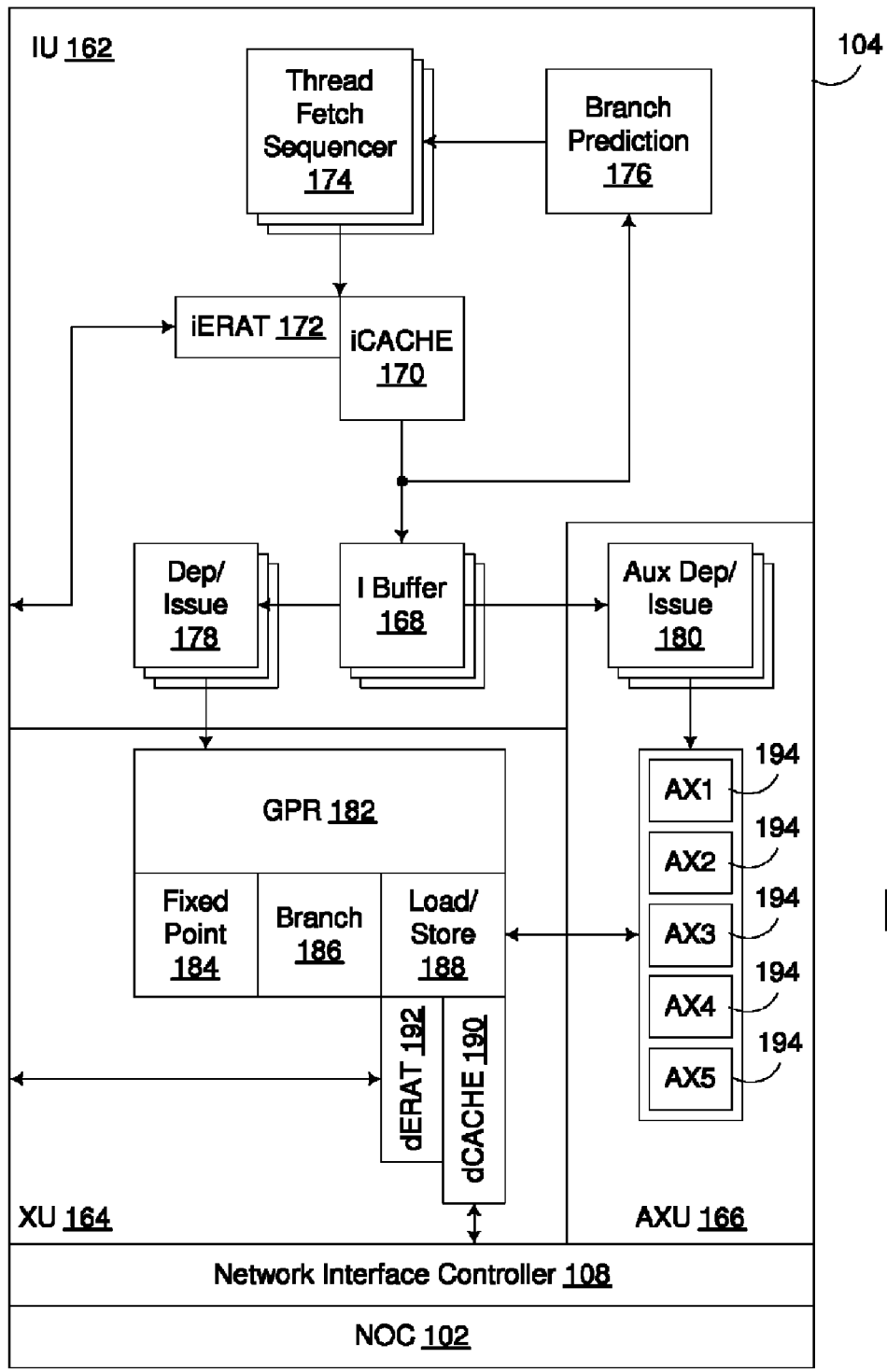
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32$b$ or 64$b$ PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Dynamic Range Adjusting Floating Point Execution Unit

Figure 5:
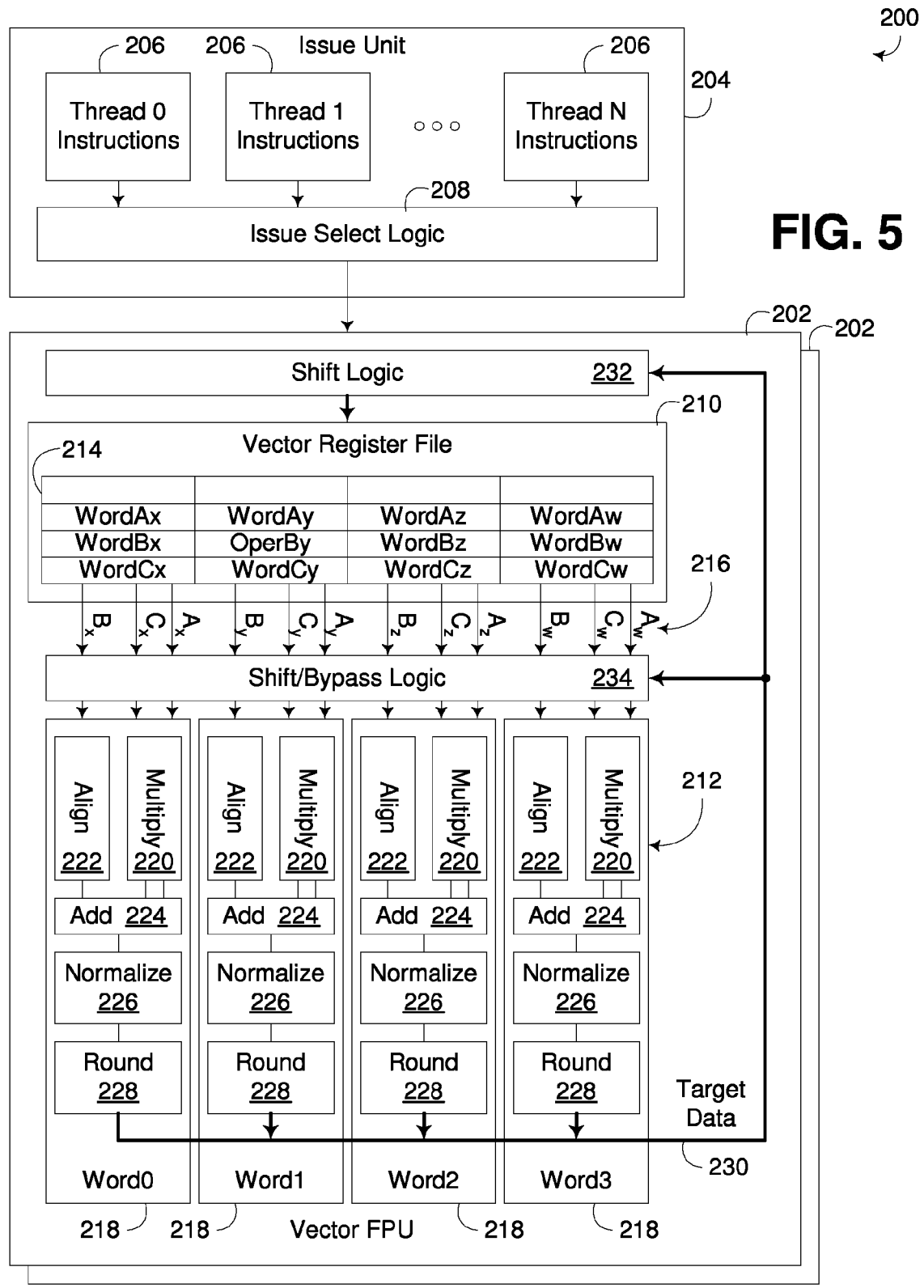
FIG. 5 is a block diagram of a processing unit incorporating a dynamic range adjusting vector floating point execution unit consistent with the invention, and capable of being implemented within an IP block from the NOC of FIG. 2.

Turning now to FIG. 5, this figure illustrates an exemplary processing unit 200 incorporating a dynamic range adjusting floating point execution unit 202 consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Dynamic range adjusting floating point execution unit 202 is implemented as a vector floating point execution unit that receives floating point instructions from issue logic 204. Issue logic 204 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. When multiple execution units 202 are supported, issue select logic 208 is also capable of issuing multiple instructions to the multiple execution units each cycle. In some embodiments, however, only one execution unit may be supported, and furthermore, in some embodiments multi-threaded issue of instructions may not be supported.

Dynamic range adjusting floating point execution unit 202 processes instructions issued to the execution unit by issue unit 204, and includes a register file 210 coupled to a multi-stage execution pipeline 212 capable of processing data stored in register file 210 based upon the instructions issued by issue logic 202, and storing target data back to the register file. Execution unit 202 may be implemented as a number of different types of execution units, e.g., a generic floating point unit, or a specialized execution unit such as a graphics processing unit, encryption/decryption unit, coprocessor, XML processing unit, etc., and may be implemented either as a vector or scalar-based unit. In addition, a dynamic range adjusting floating point execution unit 202 consistent with the invention may include only a single processing lane in some embodiments.

In the implementation illustrated in FIG. 5, for example, multi-stage execution pipeline 212 is implemented as a vector floating point unit, e.g., as might be used for image processing, which processes single instruction multiple data (SIMD) instructions issued to the execution unit by issue logic 204. Register file 210 includes a plurality (e.g., 128) of vector registers 214, each including a plurality (e.g., four) words. A plurality of register file inputs and outputs (not shown) are provided to write floating point values into selected registers and output the contents of selected registers to the pipeline 212 for processing. A plurality of operand inputs 216 are provided between register file 210 and multi-stage execution pipeline 212 to provide floating point vectors to the pipeline for processing. Pipeline 212 includes a plurality (e.g., four) processing lanes or sub-units 218 capable of processing vectors stored in register file 210 based upon the instructions issued by issue logic 204, and storing target data back to a vector register in register file 210.

Given the configuration of execution unit 202 as a floating point unit usable in image processing applications, each processing lane 218 is configured to process floating point instructions. While a wide variety of other floating point architectures may be used in the alternative, execution unit 202 includes a pipelined floating point execution architecture capable of operating on three vector operands, denoted A, B and C. For vector operations, four 32-bit word vectors are supported, with the words in each vector being denoted as X, Y, Z and W, and as such, each processing lane 218 receives three operand words, one from each vector. Thus, for example, for the processing lane 218 that processes the X word from each vector, the operands fed to that processing lane are denoted as $A_X$, $B_X$ and $C_X$.

Each processing lane 218 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 218 is also pipelined to further improve performance. Accordingly, each processing lane 218 includes a plurality of pipeline stages for performing one or more operations on the operands. For example, for a first stage, each processing lane may include a multiplier 220 for multiplying the A and C operands. In one embodiment of the invention, the multiplication of operands may be performed in a first stage of the pipeline as illustrated in FIG. 5.

Each processing lane 218 may also include an aligner 222 for aligning operand B with the product computed by multiplier 220, in parallel with the computation of the product. While alignment is shown in the same pipeline stage in FIG. 5, one skilled in the art will recognize that the multiplication and alignment may be performed in separate pipeline stages in other embodiments.

Each processing lane 218 may also include an adder 224 for adding two or more operands. In one embodiment (illustrated in FIG. 5), each adder 224 is configured to receive the product computed by multiplier 220 (output as a sum and carry), and add the product to the aligned operand output by aligner 222. Therefore, each processing lane 218 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 218 may also include a normalizing stage, and a rounding stage, as illustrated in FIG. 5. Accordingly, a normalizer 226 may be provided in each processing lane. Normalizer 226 may be configured to represent a computed value in a convenient exponential format. For example, normalizer 226 may receive the value 0.0000063 as a result of an operation. Normalizer 226 may convert the value into a more suitable exponential format, for example, $6.3 \times 10^{-6}$. The rounding stage may incorporate a rounder 228 that is capable of rounding a computed value to a desired number of decimal points. For example, a computed value of 10.5682349 may be rounded to 10.568 if only three decimal places are desired in the result. In one embodiment of the invention rounder 228 may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 222 may be configured to align operand B, a product computed by multiplier 220, or both. Furthermore, embodiments of the invention are not limited to the particular components described in FIG. 5. Any combination of the illustrated components and additional components such as, but not limited to, leading zero anticipators, dividers, etc. may be included in each processing lane 218 consistent with the invention.

Dynamic range adjusting floating point execution unit 202 supports multiple floating point formats such that during execution of a first type of floating point instruction, a first floating point format is used, while during execution of a second type of floating point instruction, a second type of floating point format is used. In the illustrated embodiments, the two floating point formats are based upon the same size floating point values (e.g., 32 bits), but differ in that a portion of the bits that are used as significand bits in one format are repurposed for use as exponent bits in the other format.

Figure 6:
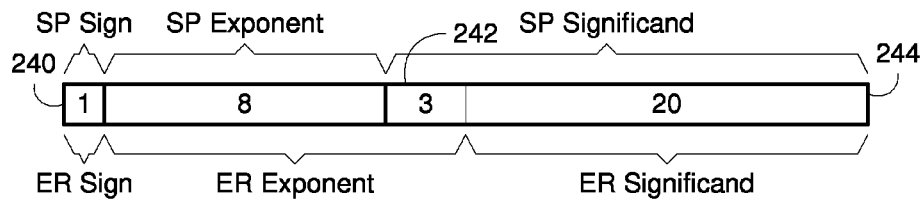
FIG. 6 is a block diagram of an exemplary extended range floating point number format suitable for use in the dynamic range adjusting vector floating point execution unit of FIG. 5.

For example, as shown at 240 in FIG. 6, in one illustrative embodiment, an extended range floating point format may be configured similarly to an IEEE 745 single precision (non-extended) floating point format. In the IEEE 745 single precision format, a one bit sign field is provided, along with an eight bit single precision (SP) exponent field and 23 bit SP significand field. The extended range floating point format still uses a total of 32 bits, however, the significand field from the IEEE 745 single precision format is broken into first and second portions 242, 244, with the first portion concatenated with the SP exponent field to provide 11 bits for an extended range (ER) exponent field, and the remaining 20 bits in the second portion 244 of the SP significand field used as the ER significand field. In addition, based upon the additional exponent bits, the exponent bias becomes decimal 1023, which of note is also the same bias as is used for double precision floating point values.

In the illustrated embodiment, floating point instructions based upon the single precision format are referred to as non-extended range floating point instructions, while floating point instructions based upon the extended range format are referred to as extended range floating point instructions. Consequently, when execution unit 202 executes non-extended range floating point instructions, any floating point values provided as operands are decoded to use the data stored in the exponent fields as the exponents and to concatenate the data stored in the first and second portions of the significand fields for use as significands. In contrast, when execution unit 202 executes extended range floating point instructions, any floating point values provided as operands are decoded to concatenate the data stored in the exponent fields and the first portions of the significand fields for use as exponents and to use the data stored in the second portions of the significand fields as significands.

The range extended format utilized in the illustrated embodiments allows arithmetic to be performed that would normally overflow using single precision numbers, yet consumes far less circuit area than a double precision unit, and has approximately the same performance as a single precision unit. In addition, no extra memory storage is typically needed to accommodate this format. In addition, the circuit changes required to implement support for the extended range format in a single precision unit are typically minimal in nature.

Figure 7:
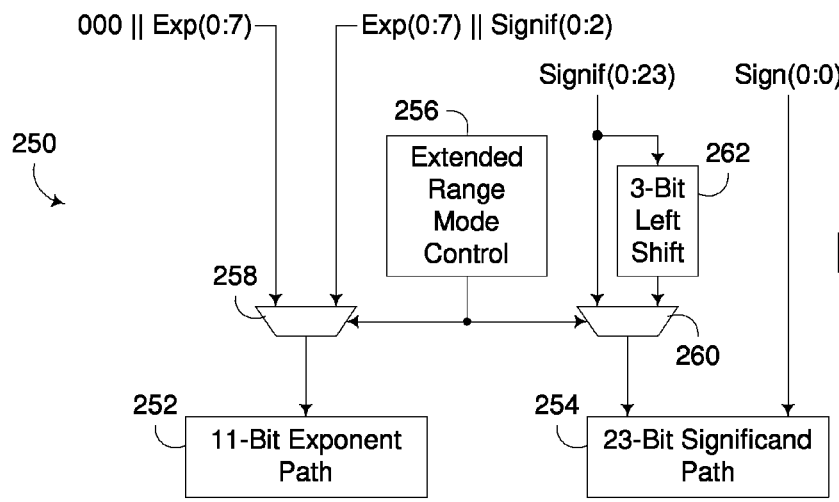
FIG. 7 is a block diagram of an exemplary implementation of shift and concatenation logic in the dynamic range adjusting vector floating point execution unit of FIG. 5.

FIG. 7, for example, illustrates a simplified representation of a portion of an exemplary floating point execution unit 250 including an exponent path 252 and significand path 254, respectively representing the floating point processing logic that is applied to the exponent and significand portions of floating point values. In this representation, only a single operand input is shown, although it will be appreciated that multiple input operands will typically be supported. Unlike a single precision floating point unit, which typically includes an 8-bit exponent path, floating point execution unit 250 includes an 11-bit exponent path 252. Both a single precision unit, and execution unit 250, however, typically include a 23-bit significand path.

An extended range mode control logic block 256 is used to control the mode of execution unit 250 to operate in either a non-extended range/single precision mode or an extended range mode. Block 256 does so by controlling a pair of multiplexers 258 and 260 respectively coupled to the exponent and significand paths 252, 254.

For the exponent path, multiplexer 258 selects between either the bits from the exponent field concatenated with "000b" as the most significand bits, resulting in effectively an 8-bit exponent (in the non-range extended mode), or the bits from the exponent field concatenated with the three bits from the first portion of the significand field as the least significant bits, resulting in an 11-bit exponent (in the range extended mode). For the significand path, multiplexer 260 selects between either the 23 bits from the first and second portions of the significand field (in the non-range extended mode), or the output of shift logic 262, which shifts the bits in the significand field three bits to the left, and shifts in a value of "000b" in as the least significant bits (in the range extended mode). The significand path 254 also receives the sign field, which is unchanged between the two modes.

Thus, for example, for an exemplary 32-bit floating point value of "01011011110010111101000011100110," the single precision/non-extended range decode of this value would result in an exponent of "00010110111" and a significand of "1.00101111010000111100110." For the extended range format, however, this value would be decoded to have an exponent of "10110111100" and a significand of "1.01111010000111001100000."

Of note, it may be desirable in the illustrated embodiments to store floating point values, irrespective of format, in the same format in register file 210. As such, just as the significand bits of an extended range format floating point value are shifted left by one or more bits prior to processing by the significand path of the floating point execution unit, it may also be desirable to shift the significand bits of any result floating point values output by the execution unit the same number of bits to the right prior to storing any results in the register file.

For example, returning to FIG. 5, in execution unit 202, multi-stage execution pipeline 212 outputs target data 230 in the form of a result floating point vector. Shift logic, illustrated at 232 and 234, is provided in execution unit 202 to respectively shift the significand bits of floating point values right and left when the execution unit is processing extended range floating point instructions. Shift logic 234 is also combined with bypass logic that is conventionally used in floating point execution units to bypass the register file when result floating point values are used by subsequent floating point instructions, and thus shift logic 234 also receives the target data 230.

Figure 8:
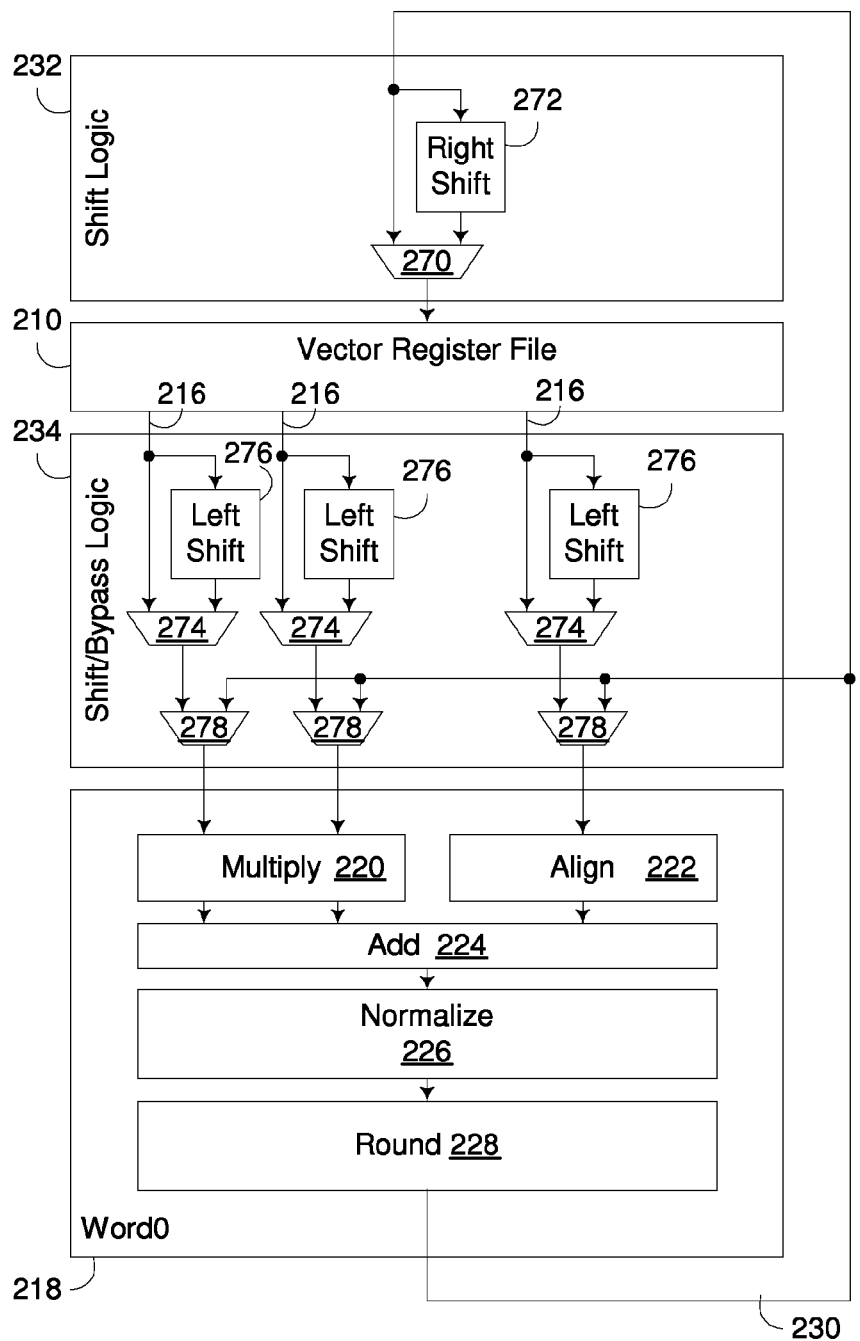
FIG. 8 is a block diagram of one of the processing lanes in the dynamic range adjusting vector floating point execution unit of FIG. 5.

FIG. 8 illustrates in shift logic 232 and 234 in greater detail. In this figure, only a single processing lane 218 is illustrated, and the separate exponent and significand paths, as well as the concatenation logic that would be disposed in the exponent path (discussed in connection with FIG. 7) are not shown for ease of understanding. It will be appreciated, however, that 11-bit exponent paths, and similar concatenation logic to that described above in connection with FIG. 7, will also typically be used in execution unit 202.

Shift logic 232 therefore includes a multiplexer 270 that, for non-extended range result floating point vectors, passes the corresponding word from the result floating point vector output at 230 directly to vector register file 210 for storage in a register unchanged. For extended range result floating point vectors, however, right shift logic 272 is used to shift the significand field of the corresponding word right three bits (and discarding the 3 LSB's) so that the least significant three bits of the exponent field can be written to the first portion of the significand field.

Given that execution unit 202 receives three operand vectors, shift logic 234 includes three multiplexers 274 that, for non-extended range floating point operands, passes unchanged the corresponding word from the floating point vector operand. For extended range floating point operands, however, left shift logic 276 is used to shift the significand field of the corresponding word left three bits (and appending "000b" as the LSB's) to properly align the significand with the significand path of the pipeline. Each multiplexer 274 outputs to one input of a corresponding bypass multiplexer 278, which passes either the corresponding word from the floating point operand vector from the register file, or the corresponding word from the result floating point vector, in a manner known in the art.

The manner in which an dynamic range adjusting floating point execution unit may be switched between processing non-extended range and extended range format floating point values may vary in different embodiments consistent with the invention. For example, an instruction set may be defined with both non-extended range and extended range format floating point instructions, such that an application developer can choose whether or not to use extended range format instructions. In other embodiments, instructions may include mode bits or secondary opcodes that define whether a floating point instruction should or should not use extended range floating point instructions. In other embodiments, an operating mode may be configurable via software, e.g., via a special purpose register (SPR), such that an application program can select the mode through a write to the SPR.

Figure 9:
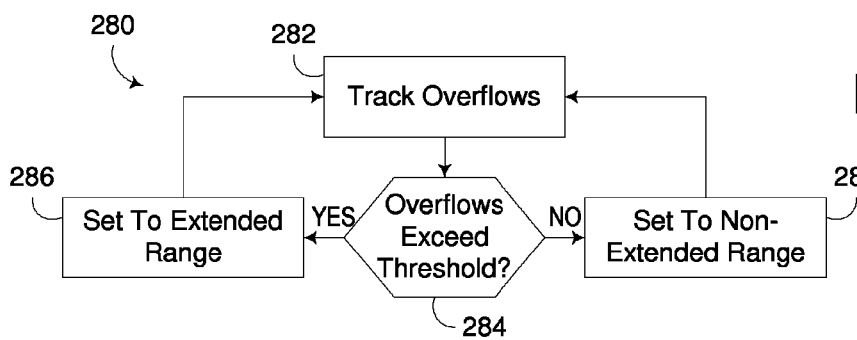
FIG. 9 is a flowchart illustrating the program flow of an automatic extended range mode selection routine capable of being implemented in the extended range mode control logic referenced in FIG. 7.

In still other embodiments, switching between modes may be automated in nature. For example, in one embodiment, it may be desirable to automatically switch to an extended range mode in response to an excessive number of overflow conditions. FIG. 9, for example, illustrates a routine 280 that may be implemented within extended range mode control logic 256 of FIG. 7. In routine 280, floating point instruction overflows are tracked in block 282; Block 284 determines whether the number of overflows has exceeded a threshold, and if so, sets the execution unit to an extended range mode in block 286. If the number of overflows has not exceeded a threshold, the execution unit is set to a non-extended range mode in block 288. The tracking of overflows then continues in block 282. It will be appreciated that the criterion upon which selecting the extended range mode may vary in different embodiments, e.g., based upon a total number of overflows exceeding a threshold, a percentage of instructions causing overflows exceeding a threshold, a number of overflows over a certain time frame exceeding a threshold, etc.

The embodiments described herein therefore allow for much greater numerical range as compared to single precision numbers while avoiding the additional circuit area and performance issues commonly associated with double precision numbers. In addition, typically minimal circuit changes are required, thus allowing implementation within conventional floating point pipelines with minimal or timing problems.

Various modifications may be made to the illustrated embodiments without departing from the spirit and scope of the invention. For example, the respective sizes of the first and second portions of the significand fields and the exponents fields may vary in different embodiments, and the invention is not limited to use in particular with single precision floating point values. In addition, more than two floating point formats may be supported in a given implementation. Other modifications will be apparent to one of ordinary skill having the benefit of the instant disclosure. Therefore, the invention lies in the claims hereinafter appended.

What is claimed is:

1. A circuit arrangement, comprising:
   a register file including a plurality of registers configured to store 32-bit floating point values, each floating point value configured with a 1-bit sign field, an 8-bit exponent field and a 23-bit significand field, with the significand field including a 3-bit first portion and a 20-bit second portion;
   a single precision floating point execution unit coupled to the register file and configured to process a first input floating point value stored in a first source register from the register file that is identified by a first floating point instruction being executed by the floating point execution unit to store a first output floating point value in a first destination register from the register file, and to process a second input floating point value stored in a second source register from the register file that is identified by a second floating point instruction being executed by the floating point execution unit to store a second output floating point value in a second destination register from the register file, wherein the floating point execution unit includes an exponent path and a significand path, wherein the first floating point instruction is a non-extended range floating point instruction and the second floating point instruction is an extended range floating point instruction, wherein the floating point execution unit is configured to execute the first floating point instruction by using data stored in the exponent field of the first input floating point value as an exponent and by concatenating data stored in the first and second portions of the significand field of the first input floating point value for use as a significand, and wherein the floating point execution unit is configured to execute the second floating point instruction by concatenating data stored in the exponent field and the first portion of the significand field of the second input floating point value for use as an exponent and by using data stored in the second portion of the significand field of the second input floating point value as a significand;

first shift logic coupled to in the significand path of the floating point execution unit and configured to receive input floating point values from the register file, the first shift logic configured to selectively shift data in the second portion of the significand field of the second input floating point value left three bits during execution of the second floating point instruction based upon the second floating point instruction being an extended range floating point instruction, the first shift logic further configured to pass unmodified the significand field of the first input floating point value based upon the first floating point instruction being a non-extended range floating point instruction; and second shift logic coupled to the significand path of the floating point execution unit and configured to receive output floating point values from the floating point execution unit, the second shift logic configured to selectively shift data in the second portion of the significand field of the second output floating point value right three bits during execution of the second floating point instruction based upon the second floating point instruction being an extended range floating point instruction, the second shift logic further configured to pass unmodified the significand field of the first output floating point value based upon the first floating point instruction being a non-extended range floating point instruction; and concatenation logic coupled to the exponent path of the floating point execution unit and configured to concatenate data from the exponent field and the first portion of the significand field of the second input floating point value during execution of the second floating point instruction based upon the second floating point instruction being an extended range floating point instruction.

2. A circuit arrangement, comprising:

an operand input configured to receive floating point operands, each floating point operand received by the operand input configured with an exponent field and a significand field, with the significand field including a first portion and a second portion; and a floating point execution unit coupled to the operand input and configured to process floating point operands received by the operand input during execution of floating point instructions, wherein the floating point execution unit is configured to execute a first floating point instruction for which a first floating point operand has been received by the operand input by using data stored in the exponent field of the first floating point operand as an exponent and by concatenating data stored in the first and second portions of the significand field of the first floating point operand for use as a significand, and wherein the floating point execution unit is configured to execute a second floating point instruction for which a second floating point operand has been received by the operand input by concatenating data stored in the exponent field and the first portion of the significand field of the second floating point operand for use as an exponent and by using data stored in the second portion of the significand field of the second floating point operand as a significand, wherein the floating point execution unit is configured to execute the first floating point instruction when in a first mode and to execute the second floating point instruction when in a second mode, and wherein the floating point execution unit is configured to automatically switch from the first mode to the second mode in response to a number of overflow conditions meeting a threshold.

3. The circuit arrangement of claim 2, wherein each floating point operand received by the operand input includes 32 bits, wherein each floating point operand includes a sign field having one bit, wherein the exponent field of each floating point operand has eight bits, wherein the first portion of the significand field of each floating point operand has three bits, and wherein the second portion of the significand field of each floating point operand has 20 bits.

4. The circuit arrangement of claim 2, further comprising a register file including a plurality of floating point registers, the register file including an output coupled to the operand input of the floating point execution unit, and an input coupled to receive a result output of the floating point execution unit.

5. The circuit arrangement of claim 4, wherein the floating point execution unit includes an exponent path and a significand path, wherein the floating point execution unit is configured to output a result floating point value at the result output, wherein the result floating point value is formatted in the same manner as each floating point operand such that the result floating point value includes an exponent field and a significand field, with the significand field including a first portion and a second portion, the circuit arrangement further comprising:

first shift logic disposed proximate a beginning of the significand path of the floating point execution unit and coupled to the operand input, the first shift logic configured to selectively shift data stored in the second portion of the significand field of the second floating point operand during execution of the second floating point instruction; and second shift logic disposed proximate an end of the significand path of the floating point execution unit and configured to selectively shift data stored in the second portion of the significand field of the result floating point value during execution of the second floating point instruction, wherein the first and second shift logic shift the same number of bits but in opposite directions.

6. The circuit arrangement of claim 5, wherein the floating point execution unit includes logic coupled to the exponent path and configured to concatenate data in the exponent field and the first portion of the significand field of the second floating point operand during execution of the second floating point instruction.

7. The circuit arrangement of claim 2, wherein the first floating point instruction is of a non-range extended format, and wherein the second floating point instruction is of a range extended format.

8. The circuit arrangement of claim 7, wherein the second floating point instruction includes a mode bit set to identify the second floating point instruction as a range extended floating point instruction.

9. The circuit arrangement of claim 2, wherein the floating point execution unit is configured to switch between the first mode and the second mode based upon data stored in a special purpose register.

10. An integrated circuit device including the circuit arrangement of claim 2.

11. A method of executing floating point instructions in a floating point execution unit, the method comprising:
receiving first and second floating point instructions, the first floating point instruction identifying a first floating point operand and the second floating point instruction identifying a second floating point operand, each of the first and second floating point operands configured with an exponent field and a significand field, with the significand field including a first portion and a second portion, wherein the exponent field, first portion of the significand field and second portion of the significand field in the first floating point operand are respectively mapped to the same bits as the exponent field, first portion of the significand field and second portion of the significand field in the second floating point operand;
executing the first floating point instruction in the floating point execution unit by using data stored in the exponent field of the first floating point operand as an exponent and by concatenating data stored in the first and second portions of the significand field of the first floating point operand for use as a significand; and
executing the second floating point instruction in the floating point execution unit by concatenating data stored in the exponent field and the first portion of the significand field of the second floating point operand for use as an exponent and by using data stored in the second portion of the significand field of the second floating point operand as a significand, wherein the floating point execution unit is configured to execute the first floating point instruction when in a first mode and to execute the second floating point instruction when in a second mode, and wherein the method further comprises automatically switching the floating point execution unit from the first mode to the second mode in response to a number of overflow conditions meeting a threshold.

12. The method of claim 11, wherein each of the first and second floating point operands includes 32 bits, wherein each of the first and second floating point operands includes a sign field having one bit, wherein the exponent field of each of the first and second floating point operands has eight bits, wherein the first portion of the significand field of each of the first and second floating point operands has three bits, and wherein the second portion of the significand field of each of the first and second floating point operands has 20 bits.

13. The method of claim 11, wherein the first and second floating point values are respectively stored in first and second source floating point registers in a register file, the method further comprising storing first and second result floating point values generated by the floating point execution unit respectively during execution of the first and second floating point instructions in first and second destination floating point registers in the register file.

14. The method of claim 13, wherein the floating point execution unit includes an exponent path and a significand path, the method further comprising:
shifting data stored in the second portion of the significand field of the second floating point operand in a first direction within the significand path during execution of the second floating point instruction; and
shifting data stored in the second portion of the significand field of the second result floating point value within the significand path in a second direction that is opposite to the first direction during execution of the second floating point instruction.

15. The method of claim 14, further comprising concatenating data from the exponent field and the first portion of the significand field of the second floating point operand in the exponent path during execution of the second floating point instruction.

16. The method of claim 11, wherein the first floating point instruction is of a non-range extended format, and wherein the second floating point instruction is of a range extended format.

17. The method of claim 16, wherein the second floating point instruction includes a mode bit set to identify the second floating point instruction as a range extended floating point instruction.

18. The method of claim 11, further comprising switching the floating point execution unit between the first mode and the second mode based upon data stored in a special purpose register.

* * * * *